United States Patent
Nyfelt

(10) Patent No.: US 10,473,251 B2
(45) Date of Patent: Nov. 12, 2019

(54) MULTI QUICK CONNECTOR FOR SUBSEA USE

(71) Applicant: CEJN AB, Skövde (SE)

(72) Inventor: Leif Nyfelt, Skövde (SE)

(73) Assignee: CEJN AB, Skövde (SE)

(*) Notice: Subject to any disclaimer, the term of this patent is extended or adjusted under 35 U.S.C. 154(b) by 378 days.

(21) Appl. No.: 15/408,969

(22) Filed: Jan. 18, 2017

(65) Prior Publication Data

US 2017/0205012 A1 Jul. 20, 2017

(30) Foreign Application Priority Data

Jan. 19, 2016 (GB) .................................... 600952.4

(51) Int. Cl.
| | | |
|---|---|---|
| *F16L 37/62* | (2006.01) | |
| *F16L 39/00* | (2006.01) | |
| *E21B 33/038* | (2006.01) | |

(52) U.S. Cl.
CPC ............ *F16L 39/00* (2013.01); *E21B 33/038* (2013.01)

(58) Field of Classification Search
CPC ..... F16L 55/1015; F16L 37/24; F16L 37/244; F16L 37/248; F16L 37/252; F16L 37/62; F16L 37/107
USPC .......... 285/1, 18, 27, 28, 29, 38, 124.1, 920, 285/396; 403/33
See application file for complete search history.

(56) References Cited

U.S. PATENT DOCUMENTS

| | | | | |
|---|---|---|---|---|
| 3,561,725 A | * | 2/1971 | Torres ..................... | F16L 37/23 251/149.2 |
| 4,392,513 A | * | 7/1983 | Parrish ................ | F16L 55/1015 137/614.01 |
| 4,567,924 A | * | 2/1986 | Brown ................... | B64D 37/16 137/797 |
| 5,904,302 A | * | 5/1999 | Brown ..................... | B64F 1/28 137/614.06 |

(Continued)

FOREIGN PATENT DOCUMENTS

| | | |
|---|---|---|
| CN | 104315282 A | 1/2015 |
| GB | 2498956 A | 8/2013 |
| GB | 2511546 A | 9/2014 |

OTHER PUBLICATIONS

General Electric Company, 2012, "FLX360 flying lead, multi-function subsea connection system", geoilandgas.com, [online], Available from: https://www.geoilandgas.com/sites/geog.dev.local/files/ge_flx360_fs_121912.pdf [Accessed Jun. 16, 2017].

*Primary Examiner* — Aaron M Dunwoody
(74) *Attorney, Agent, or Firm* — Winstead PC

(57) ABSTRACT

Connector for fluid, connectable by a remotely operated vehicle, ROV, includes a first part including a first cam element including an opening and a cam for engagement of a protrusion, the first cam element and the cam being rotably arranged relative to the first part; a second part includes a second cam element for insertion into the opening, the second cam element including the protrusion for the cam; a clutch between the first cam element and a handle to be held by the ROV; an indicator on the first part to indicate correct position for connecting, and disconnecting, the first part with, or from, the second part with the first and second cam elements; and an emergency release mechanism to disconnect the first part from the second part.

20 Claims, 6 Drawing Sheets

(56) References Cited

U.S. PATENT DOCUMENTS

| | | | |
|---|---|---|---|
| 6,595,552 B1* | 7/2003 | Mortari | F16L 39/00 |
| | | | 285/18 |
| 6,769,830 B1* | 8/2004 | Nygren | B64G 1/641 |
| | | | 29/446 |
| 7,988,200 B2* | 8/2011 | Krywitsky | F16L 37/113 |
| | | | 285/312 |
| 10,343,891 B2* | 7/2019 | Murugo Perez | B67D 7/06 |
| 2002/0109352 A1 | 8/2002 | Smith | |
| 2004/0050450 A1* | 3/2004 | Lambert | F16L 37/252 |
| | | | 141/346 |
| 2005/0139265 A1* | 6/2005 | Krywitsky | F16L 37/244 |
| | | | 137/384 |
| 2014/0112699 A1 | 4/2014 | Lewkoski | |

* cited by examiner

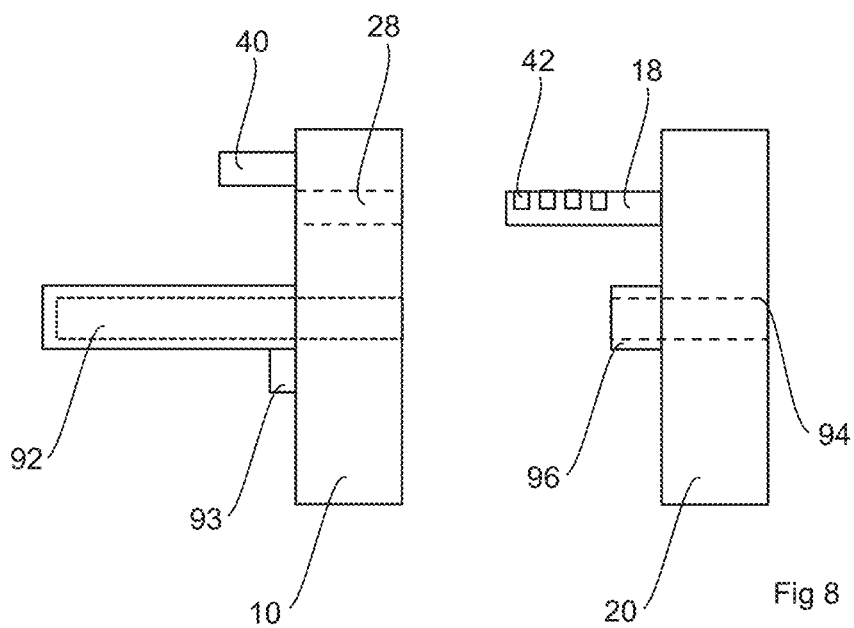

MULTI QUICK CONNECTOR FOR SUBSEA USE

TECHNICAL FIELD

The disclosure relates to a connector, and a method to connect the connector, and a method to disconnect the connector, also in a situation of emergency when the normal method of disconnection does not work. More specifically, the connector and methods concern a connector for fluid, connectable by a remotely operated vehicle, ROV. More specifically, the connector and methods concern a connector for fluid, connectable by a remotely operated vehicle, ROV, subsea.

BACKGROUND

Some work within the oil and gas industry takes place subsea, under water, with the help of a remotely operated vehicle, ROV. Such work can take place deep under water, for example on 3000 meters depth. This puts high demands on the ROV, the operator of the ROV, and related equipment. Light and visibility views normally disappear below 40 meters depth in the water and artificial light must be added. Such subsea work is often difficult, time consuming and expensive. US2002/0109352 may be useful for understanding this disclosure.

In the past years much attention has been given to ensure that no oil spill or any other spill occurs in the sea. A no oil spill requirement enforces special limitations and restrictions when handling a fluid subsea. Accidents, or even lost equipment, should be avoided. National rules and regulations in this respect put a further limitation on subsea oil and gas work and equipment. The present invention is directed to overcoming one or more of the problems as set forth above.

SUMMARY

It is an object of the present invention to provide a connector for fluid, connectable by a remotely operated vehicle, ROV, and methods for connecting and disconnecting such a connector. This object can be achieved by the features as defined in the independent claims. Further enhancements are characterized in the dependent claims.

According to one embodiment, a connector for fluid, connectable by a remotely operated vehicle, ROV, comprises: a first part (10) comprising a lead screw (92) for engagement with a thread (94), the lead screw (92) being rotably arranged relative to the first part (10); a second part (20) comprises the thread (94); a clutch (30) between the lead screw (92) and a handle (90) to be held by the ROV; an indicator (40) on the first part (10) to indicate correct position for connecting, and disconnecting, the first part (10) with, or from, the second part (20) with the lead screw (92) and the thread (94); and an emergency release mechanism (50) to disconnect the first part (10) from the second part (20).

According to one embodiment, a connector for fluid, connectable by a remotely operated vehicle, ROV, comprises: a first part (10) comprising a first cam element (12) comprising an opening (16) and a cam (14) for engagement of a protrusion (24), the first cam element (12) and the cam (14) being rotably arranged relative to the first part (10); a second part (20) comprises a second cam element (22) for insertion into the opening (16), the second cam element (22) comprising the protrusion (24) for the cam (14); a clutch (30) between the first cam element (12) and a handle (90) to be held by the ROV; an indicator (40) on the first part (10) to indicate correct position for connecting, and disconnecting, the first part (10) with, or from, the second part (20) with the first and second cam elements (12, 22); and an emergency release mechanism (50) to disconnect the first part (10) from the second part (20).

According to one embodiment, the emergency release mechanism is a wire (50) connected to the lead screw (92), or the first cam element (12), respectively, the wire (50) going through a wire opening (52), the wire opening (52) being arranged radially from the lead screw (92), or the cam (14), respectively, on the first part (10) to allow the wire (50) to release the lead screw (929), or rotate the cam (14), respectively, when the wire (50) is pulled. Furthermore, the length of the wire (50) may be shorter than the length of a shortest tube (80), for the fluid, arranged on the first part (10). There may be one or more tubes for fluid between the ROV and the first part (10) and the wire (50) may be about 10 cm shorter than the length of a shortest tube (80) for fluid.

According to one embodiment, the thread (94) is threaded according to one, or both, of the following two options: directly in the second part (20), or in a nut (96) comprised by the second part (20). This embodiment has thus the three alternatives, firstly where the thread (94) is threaded directly in the second part (20), secondly where the thread (94) is threaded in a nut (96) and the second part (20) comprises the nut (96), and thirdly where the thread (94) is threaded directly in the second part (20) and the thread (94) is threaded in a nut (96) and the second part (20) comprises the nut (96).

According to one embodiment, the second part (20) comprises at least one guide pin (18); wherein the first part (10) comprises at least one openings (28) corresponding to the at least one guide pin (18); and wherein a plurality of magnets (42) are arranged axially along on one of the at least one guide pin (18), and wherein the magnets (42) activate the indicator (40) when the one of the least one guide pin (18) is, at least partly, inside the corresponding at least one opening (28) of the first part (10).

According to one embodiment, a magnet (42) is arranged on the second cam element (22), and wherein the magnet (42) activates the indicator (40) when the second cam element (22) is, at least partly, inside the opening (16) of the first cam element (12). This may be in a position where rotation of the first cam element (12) engages the cam (14) with the protrusion (24) of the second cam element (22) to pull the first part (10) and the second part (20) together, and in this position the first part (10) and be pulled away from the second part (20) without the cam (14) locking with the protrusion (24).

According to one embodiment, the clutch (30) is a torque limiting clutch preventing rotation of the lead screw (92), or the first cam element (12), respectively, when the handle (90) is rotated over a pre-set torque. This to avoid the ROV to transmit a too high momentum, torque, destroying the connector. The torque limiting clutch may be a slip clutch.

According to one embodiment, the connector may further comprise a first aiming element (60) arranged on the first part (10); and a second aiming element (62) arranged on the second part (20). Preferably, the first aiming element (60) is arranged, measured from a centre axis of the lead screw (92), or the first cam element (12), at the same radial distance as the second aiming element (62) is arranged, measured from a centre axis of the thread (94), or the second cam element (22), respectively. The two aiming elements are to be lined up relative to each other, and the indicator (40) may be preferably visible within the line of the aim (viewed from the ROV by the operator).

According to one embodiment, the connector may further comprise a mechanical visible element (70) for indicating connected or disconnected status of the connector, the mechanical visible element (70) being connected to the lead screw (92), the rotation of the lead screw (92)) positioning the mechanical visible element (70) in a first (end) position indicating a disconnected status (72) of the connector and in a second (end) position indicating a connected status (74) of the connector. According to one embodiment, the connector may further comprise a mechanical visible element (70) for indicating connected or disconnected status of the connector, the mechanical visible element (70) being connected to the first cam element (12), the rotation of the first cam element (12) positioning the mechanical visible element (70) in a first position indicating a disconnected status (72) of the connector and in a second position indicating a connected status (74) of the connector. These may be two different end positions. The mechanical visible element (70) may be a lever, in a bright visible colour, preferably visible from the ROV, in the same view as the aim. Alternatively, when a lead screw is used, then the mechanical visible element (70) is connected to the lead screw, for example by gearing.

According to one embodiment, the connector further comprises a lock (93) for locking rotation of the lead screw (92), or rotation of the first cam element (12), relative to the first part (10), the lock allowing the rotation when a guide pin (18) is inside an opening (28) and the lock locking the rotation when the guide pin (18) is outside the opening (28).

According to one embodiment, the first part (10) comprises at least two guide pins (18), one of the guide pins (18) being longer than the other guide pins (18); and wherein the second part (20) comprises at least two openings (28) corresponding to the one or more guide pins (18).

According to one embodiment, the first part (10) and/or the second part (20) comprise one or more non-spill quick fit couplings for fluid. This to connect the tubes (80) for fluid from the ROV to the first part (10), which in turn connects to the second part (20) via the non-spill quick fit couplings.

According to one embodiment, the connector has the cam mechanism in the opposite direction. That is the first part (10) comprises the second cam element (22) comprising the cam (14) and the opening (16); and the second part (20) comprises the first cam element (12) comprising the protrusion (24).

According to one embodiment, a method for connecting a connector, according to any one of the preceding embodiments, using a remotely operated vehicle, ROV, is disclosed. The method comprising the following steps in order: firstly, moving the first part (10) and the second part (20) relatively toward each other; secondly the indicator (40) indicating when, if a lead screw (92) is used then when the lead screw is at least in contact with the thread (94), or if a cam is used then when the second cam element (29) is at least partly inside the first cam element (10), and the cam (14) and the protrusion (24) are physically engaged; (This is when the cam mechanism is ready to engage by rotation, i.e. when the first part (10) and the second part (20) are lined up relative to each other, and the cam (14) and the protrusion (24) are in position for physical engagement); and thirdly upon indication of the indicator (40), rotating the first cam element (12) relative to the second cam element (22) until the first part (10) and the second part (20) are fully connected.

This method may further comprise the mechanical visible element (70) indicating the connected status within the view of the aim.

According to one embodiment, a method for disconnecting a connector, according to any one of the connector embodiments, using a remotely operated vehicle, ROV. The method comprising the following steps in order: firstly, if a lead screw is used, then disconnecting the lead screw (92) from the thread (94) by rotating the lead screw (92) relative to the thread (94), and when the lead screw (92) physically separateable from the thread (94) then the indicator (40) indicates; if a cam is used, then disconnecting the first cam element (12) from the second cam element (22) by rotating the first cam element (12) relative to the second cam element (22), and when the second cam element (29) is at least partly inside the first cam element (10), and the cam (14) and the protrusion (24) are physically separateable then the indicator (40) indicates; and secondly upon indication of the indicator (40), moving the first part (10) and the second part (20) relatively away from each.

According to one embodiment, the connector as well as the methods are further characterised by that the indicator is one or more of the following: light, flashing light, light in different colours (preferably blue, red, green, orange, pink and yellow), sound, and a light combination of blue, green, and yellow light. This light combination is well visible in the water regardless of the colour of the water.

According to one embodiment, a method for disconnecting a connector with the wire in an emergency situation (emergency being when the connector can not be disconnected by the method disclosed above) using a remotely operated vehicle, ROV, the method comprising, if a lead screw is used, then disconnecting the lead screw (92) from the thread (94) by pulling the wire (50) by retracting the ROV, or only the wire (50), to separate the lead screw (92) from the thread (94); if a cam is used, then disconnecting the first cam element (12) from the second cam element (22) by pulling the wire (50) by retracting the ROV, or only the wire (50), to rotate the first cam element (12) relative to the second cam element (22); and moving the first part (10) and the second part (20) relatively away from each other. This movement may be done by the ROV. In this way, by simply moving out the ROC the connector is guaranteed to disconnect, in other words, the ROV will not get stuck with the connector.

At least one of the above embodiments provides that the connector and the methods render subsea work easy, faster and less expensive, even deep below the surface. Oil spills or any other spills may be avoided. Requirements, limitations, and restrictions for no oil spill when handling a fluid subsea may be complied with. Accidents may be avoided and equipment will not be lost. National rules and regulations for subsea work may be complied with. Further advantages and technical effects of the embodiments are described below.

At least one of the above embodiments provides one or more solutions to the problems and disadvantages with the background art. Other technical advantages of the present disclosure will be readily apparent to one skilled in the art from the following description and claims. Various embodiments of the present application obtain only a subset of the advantages set forth. No one advantage is critical to the embodiments. Any claimed embodiment may be technically combined with any other claimed embodiment(s).

BRIEF DESCRIPTION OF THE DRAWINGS

The accompanying drawings illustrate presently preferred exemplary embodiments of the disclosure, and together with the general description given above and the detailed description of the preferred embodiments given below, serve to explain, by way of example, the principles of the disclosure.

FIG. 7 is a diagrammatic illustration of a method for disconnecting such a connector in a situation of emergency according to an exemplary embodiment of the present disclosure and FIG. 8 is a diagrammatic illustration of a connector according to an exemplary embodiment of the present disclosure.

DETAILED DESCRIPTION

Figure 1:
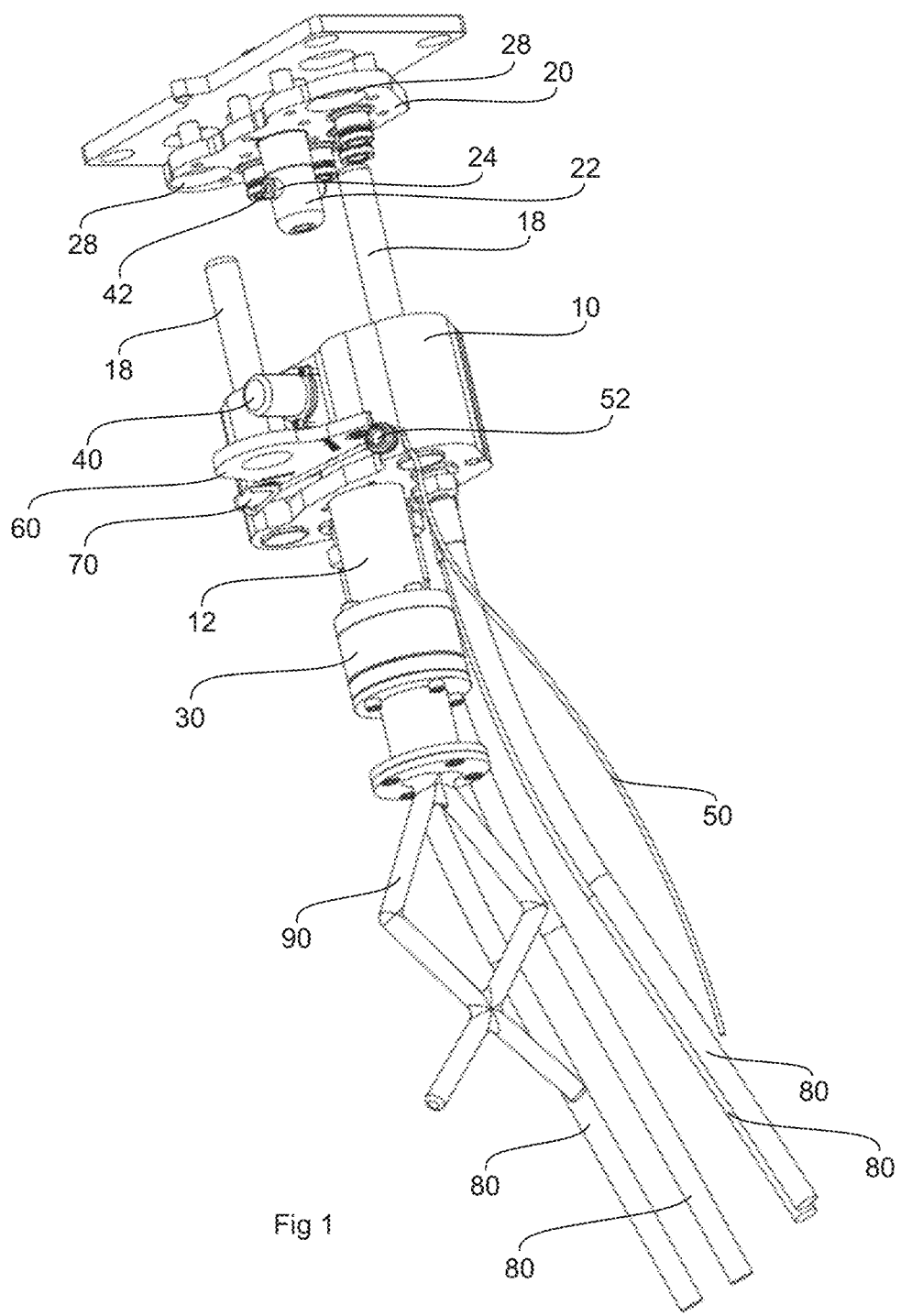
FIG. 1 is a diagrammatic illustration of a connector according to an exemplary embodiment of the present disclosure.
Figure 2:
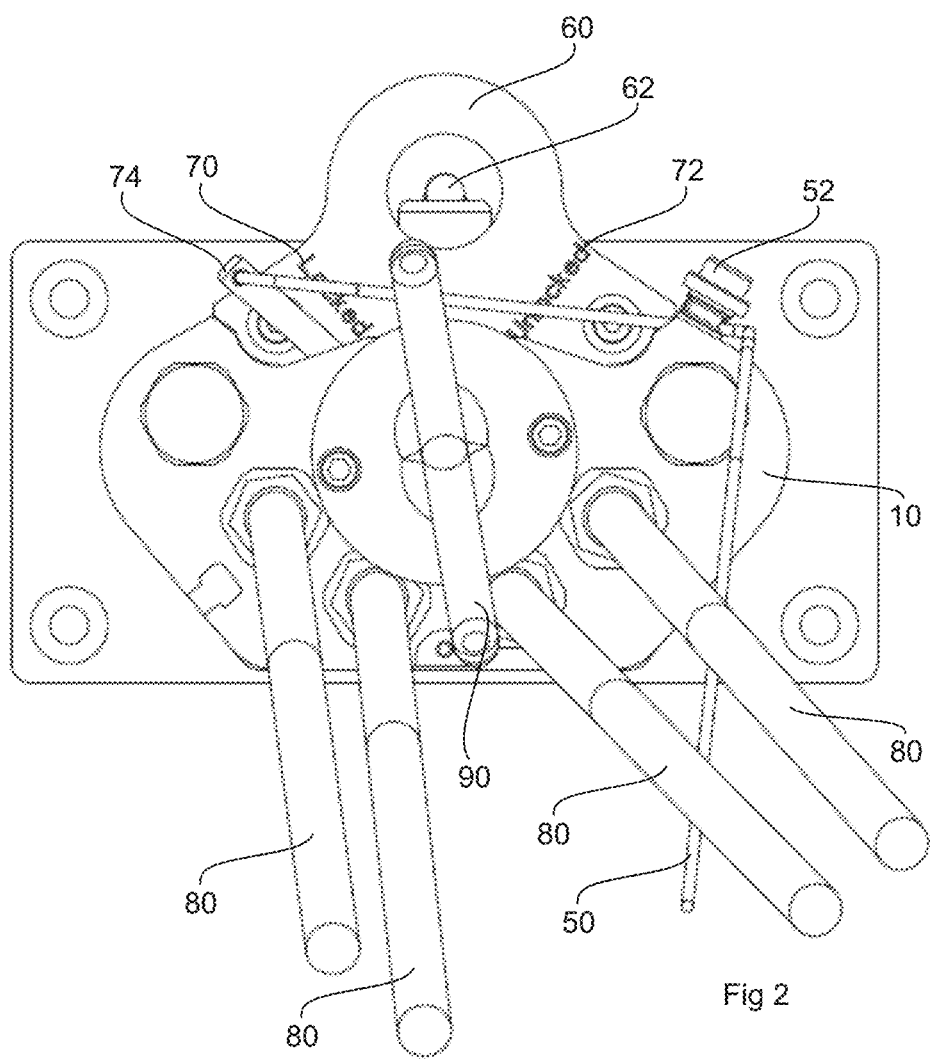
FIG. 2 is a diagrammatic illustration of a connector according to an exemplary embodiment of the present disclosure.
Figure 3:
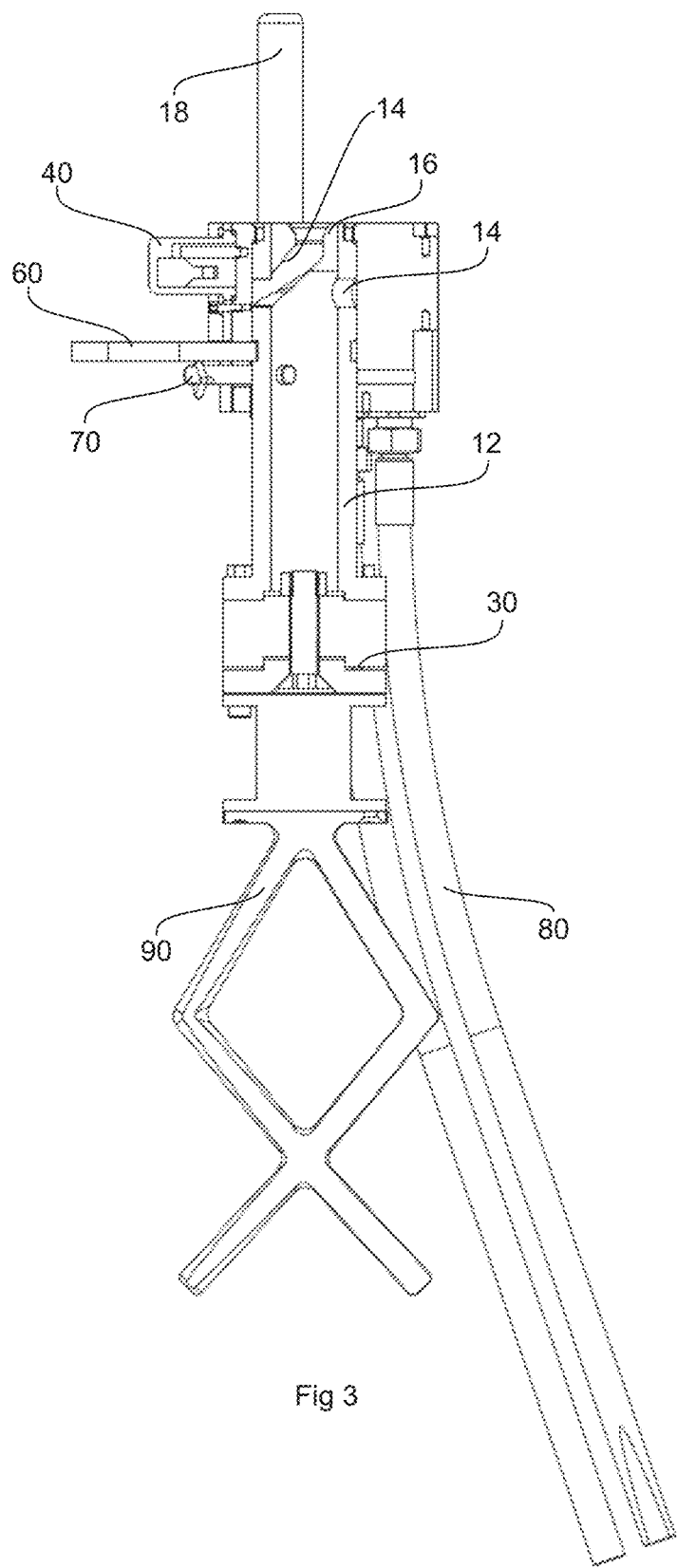
FIG. 3 is a diagrammatic illustration of a connector according to an exemplary embodiment of the present disclosure.

FIGS. 1 to 3 illustrates schematically a connector for fluid. Such fluid may be hydraulic fluid, for example hydraulic fluid under pressure. The connector is connectable by a remotely operated vehicle, ROV. The ROV may use the connector when performing work subsea where a supply of fluid, such a high pressure hydraulic is needed.

The connector comprises a first part (10) comprising a first cam element (12) comprising an opening (16) and a cam (14) for engagement of a protrusion (24), the first cam element (12) and the cam (14) being rotably arranged relative to the first part (10). The connector further comprises a second part (20) comprises a second cam element (22) for insertion into the opening (16), the second cam element (22) comprising the protrusion (24) for the cam (14). The first cam element (12) with the opening (16) and the cam (14) and the second cam element (22) with the protrusion (24) form a cam mechanism. This cam mechanism is used for connecting and disconnecting the connector, i.e. connecting and disconnecting the first part (10) and the second part (20). When the protrusion (24) engages the cam (14), then the first cam element (12) may be rotated. The protrusion (24) and the cam (14) interact and pull the first part (10) and the second part (20) together. Depending on which direction the first cam element (12) is rotated the first part (10) and the second part (20) is either pulled together (connecting the connector) or the pressed apart (disconnecting the connector).

The connector further comprises a clutch (30), best seen in FIG. 3, between the first cam element (12) and a handle (90) to be held by the ROV. The ROV is very strong and even the subsea current may rotate the ROV out of control. The clutch prevents that the ROV destroys the connector by turning the first cam element (12) too much. The clutch may be a slip clutch limiting the torque on the connector, for example the torque on the first cam element (12).

The connector further comprises an indicator (40), see FIGS. 1 to 4, on the first part (10) to indicate correct position for connecting, and disconnecting, the first part (10) with, or from, the second part (20) with the first and second cam elements (12, 22). The indicator makes it possible for an operator of the ROV to know when the connector is connected by the cam mechanism or disconnected by the cam mechanism.

The connector further comprises an emergency release mechanism (50) to disconnect the first part (10) from the second part (20). If everything fails with the connector, then it would be good if the ROV could return to the surface and in that process disconnect the connector without any spill of fluid. The emergency release mechanism (50) provides such a disconnection.

The connector with the two parts (10, 20) and the cam mechanism, together with the clutch (30), the indicator (40), and the emergency release mechanism (50) provides a safe and reliable way to connect fluid. Such a connector solves one or more of the problems mentioned herein. A ROV can safely and easily operate such a connector.

According to one embodiment the clutch (30) is a torque limiting clutch preventing rotation of the first cam element (12) when the handle (90) is rotated over a pre-set torque. This prevents the ROV to transmit a too high momentum, torque, destroying the connector). The torque limiting clutch may be a slip clutch, a safety clutch. In FIG. 3 an exemplary slip clutch is illustrated having spring loaded balls engaging openings in a plate. When the torque exceeds a certain value, then the balls will pop out of the openings and the clutch will slip. The ROV may be very strong and can often not determine what precise torque, momentum, the ROV transfers to the connector. It is difficult to determine if the ROV is in an end position (fully connected or fully disconnected connector) or somewhere between. The ROV can break or deform equipment. Even subsea current may rotate the ROV causing unwanted torque. The torque limiting clutch prevents these problems and situation to occur, because the clutch (30) will simply slip without damaging the connector. The clutch (30) may also start to slip when an end position (fully connected or fully disconnected connector) is reached. The clutch (30) may also start to slip when the connector is in a wrong position, for example a wrong mid position.

According to one embodiment, the connector further comprises a first aiming element (60) arranged on the first part (10); and a second aiming element (62) arranged on the second part (20). See FIGS. 1 to 4. According to one embodiment, the first aiming element (60) is arranged, measured from a centre axis of the first cam element (12), at the same radial distance as the second aiming element (62) is arranged, measured from a centre axis of the second cam element (22). The aim arranged on the connectors guides the operator of the ROV when the operator connects the connector. The ROV may be equipped with a camera and the operator may see on a screen the robot arm holding the connector. The darkness of subsea may be lit up with ROV lamps. The picture may be distorted by the water and distances and positions are difficult to access. The aim guides the operator to guide the first part (10) together with the second part (20) of the connector. The aim aids to line up the first and second parts (10, 20) of the connector. Furthermore, according to one embodiment, the indicator (40) is arranged visible within the line of the aim (60, 62) when the aim is aligned. This may be taken from FIG. 4. The view that the camera of the ROV has for looking at the connector is the same view as the aim, and it is within this view (aim) that the indicator preferably is arranged, FIG. 4 being part of that view. In other words, the aim (60, 62) and the indicator (40) are arranged in the view of the ROV looking at the connector, for example just above the cam mechanism of the connector.

According to one embodiment, see FIG. 1, a magnet (42) is arranged on the second cam element (22), and wherein the magnet (42) activates the indicator (40) when the second cam element (22) is, at least partly, inside the opening (16) of the first cam element (12). The magnet activates the indicator to indicate, for example blinking light. This activation may be done in a position where rotation of the first cam element (12) engages the cam (14) with the protrusion (24) of the second cam element (22) to pull the first part (10) and the second part (20) together, and in this position the first part (10) and the second part (20) may be pulled away from each other without the cam (14) locking with (holding) the protrusion (24). The indicator (beacon) may in this way indicate to the operator when the correct position has been reached for activating the cam mechanism to pull the first part (10) and the second part (20) together. The indicator (beacon) may in this way also indicate to the operator when the correct position has been reached for pulling the first part (10) and the second part (20) away from each other when disconnecting the connector without the cam mechanism being locked. To avoid damage to the connector or to ensure proper connection, the indicator indicates (to the operator) when the first part (10) and the second part (20) of the connector are in the right position to be connected by the cam mechanism or when they are in the right position to be disconnected. Problems with the previously mentioned bad visibility, darkness, and distortions, including difficulties to determine distances and positions are thus overcome with the use of the indicator (40). Preferably the indicator is one or more of the following: light, flashing light, light in different colours (blue, red, green, orange, pink and yellow), sound, and a light combination of blue, green, and yellow light. Especially the flashing light combination of blue, green, and yellow light is particularly advantageous subsea, because such a combination is well visible in most different colours of the water, including distortions.

Figure 4:
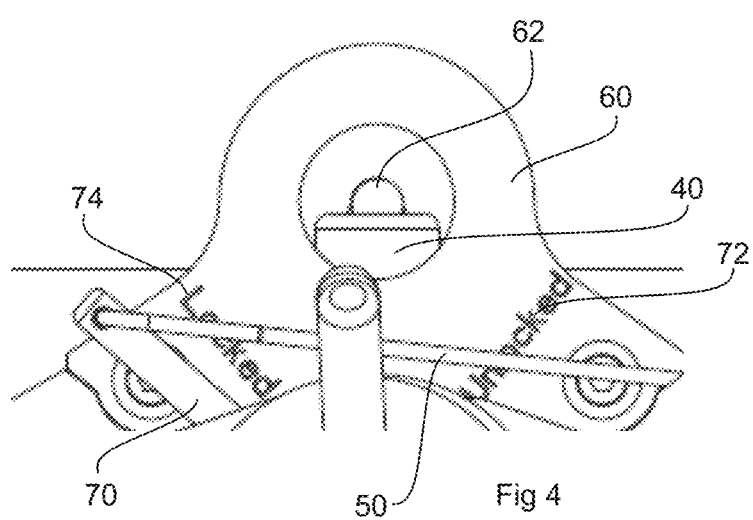
FIG. 4 is a diagrammatic illustration of a connector according to an exemplary embodiment of the present disclosure.

According to one embodiment, the connector may further comprise a mechanical visible element (70) for indicating connected or disconnected status of the connector, the mechanical visible element (70) being connected to the first cam element (12), the rotation of the first cam element (12) positioning the mechanical visible element (70) in a first (end) position indicating a disconnected status (72) of the connector and in a second (end) position indicating a connected status (74) of the connector. See FIGS. 1, 2, and 4. The first and second positions are two different positions. The first position may be a first end position and the second position may be a second end position. The mechanical visible element may be a lever, preferably in a different colour then the rest of the connector. Mechanically visible means visible from the ROV working with the connector, such as shown in FIG. 4 and disclosed above with relation to the aim. It may be the same view as the aim for the operator of the ROV. The connected or disconnected status is the respective end positions of the cam mechanism, engagement or not of the cam (14) and protrusion (24). The mechanical visible element (70) clearly indicates that the connector is connected or disconnected. It shows in which direction the first cam element (12) must be rotated to open or close the connector, respectively.

According to one embodiment, best shown in FIGS. 1 and 2, the emergency release mechanism is a wire (50) connected to the first cam element (12), the wire (50) going through a wire opening (52), the wire opening (52) being arranged radially from the cam (14) on the first part (10) to allow the wire (50) to rotate the cam (14) when the wire (50) is pulled. According to one embodiment, the length of the wire (50) is shorter than the length of a shortest tube (80), for the fluid, arranged on the first part (10). The first part (10) has one or more fluid tubes (80) with couplings, for example quick fit couplings for hydraulic. The length of the wire (50) may be about 10 cm shorter than the length of the shortest fluid tube (80) of the one or more fluid tubes (80). This emergency release function can be activated by pulling the wire (50). This ensures that the connector can be taken up to the surface without considering if the connector is connected or disconnected. The connector will be disconnected automatically when the wire (50) is pulled. This avoids having to use an extra additional ROV to disconnect the connector, which would have been very expensive. It avoids that the ROV is removed inadvertently and thereby breaks the connector with oil spill as a result, because the wire (50) disconnects the connector properly. This solves the problem of having to use an additional ROV and that the connector gets damages with possible oil spill.

According to one embodiment, best shown in FIGS. 1 and 3, the connector may comprise guide pins. The first part (10) comprises at least two guide pins (18), one of the guide pins (18) being longer than the other guide pins (18). The second part (20) comprises at least two openings (28) corresponding to the one or more guide pins (18). According to one embodiment the at least two guide pins (18) may be arranged on the second part (20) and the at least two openings may be arranged on the first part (10). The guide pins (18) and the openings (28) have as a technical effect to prevent relative rotation between the first part (10) and the second part (20). One guide pin is longer than the rest of the guide pins, because it is easier for the operator to line up one guide pine with one opening, compared to lining up two guide pins with two openings.

According to one embodiment, the first part (10) and the second part (20), or only one of them, comprises one or more non-spill quick fit couplings for fluid. The ROV may hold pressurised fluid and lead this fluid through one or more fluid tubes (80) to the connector, to the first part (10). The wire (50) is, as explained above, shorter than the shortest fluid tube (80). The first part (10) of the connector have the fluid tubes (80) arranged on one side, and on the other side, the side facing the second part (20), one or more non-spill quick fit couplings. These couplings connects the flow of fluid by the first part (10) and the second part (20) being connected. Hereby the ROV can supply work or tools with hydraulic fluid subsea.

According to one embodiment, not shown in the FIGS, the cam mechanism of the first part (10) and the second part (20) may be the other way around, that is, the part of the cam mechanism that is on the first part (10) may be on the second part (20), and the part of the cam mechanism that is on the second part (20) may be on the first part (10). According to such an embodiment, the connector has an opposite cam mechanism, wherein the first part (10) comprises the second cam element (22) comprising the cam (14) and the opening (16); and wherein the second part (20) comprises the first cam element (12) comprising the protrusion (24). This disclosure discloses thus the connector with the cam mechanism with the cam (14) on the first part (10) or the connector with the cam (14) on the second part (20), and the protrusion (24) arranged accordingly on the other part, respectively.

According to one embodiment, a method for connecting a connector according to any one of the preceding embodiments using a remotely operated vehicle, ROV, is disclosed. The method is preferably executed under water. The method comprising the following steps in order.

Figure 5:
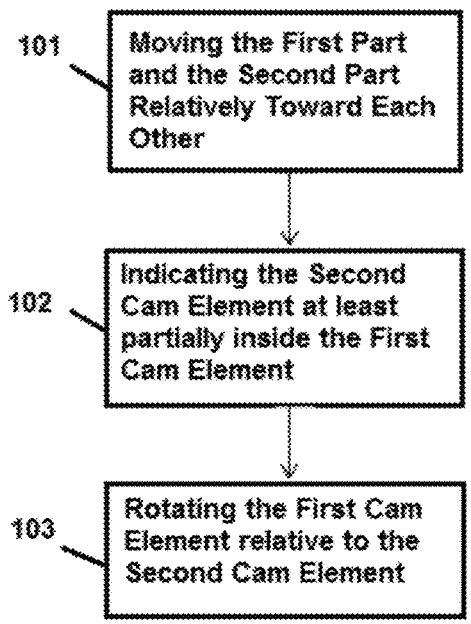
FIG. 5 is a diagrammatic illustration of a method for connecting such a connector according to an exemplary embodiment of the present disclosure.

Firstly, step 101 in FIG. 5, moving the first part (10) and the second part (20) relatively toward each other. This is done by the ROV, for example, by aligning the pins (18) with the openings (28) and moving the first part (10) so close to the second part (20) that the second cam element (22) enters, at least partly, the opening (16).

Secondly, step 102 in FIG. 5, when the second cam element (29) is at least partly inside the first cam element (10), and the cam (14) and the protrusion (24) are physically engaged, then the indicator (40) indicates. This is when the first part (10) and the second part (20) are lined up relative to each other, and the cam (14) and the protrusion (24) are in position for physical interacting (engagement/connection). At that point the indicator (40) starts to indicate. This gives the signal to the operator that the connector is ready to be engaged by rotating the cam mechanism.

Thirdly, step 103 in FIG. 5, upon indication of the indicator (40), the first cam element (12) is rotated relative to the second cam element (22) until the first part (10) and the second part (20) are fully connected. This ensures a correctly connected connector. The use of the slip clutch also contributes to a correctly connected connector.

According to a further embodiment, when the connector includes the mechanical visible element (12), the method may further comprise that the mechanical visible element (70) indicates the connected status within the view of the aim. This allows the operator to have a visual confirmation that the connector is correctly connected, i.e. that the first part (10) and the second part (20) have fully engaged.

Figure 6:
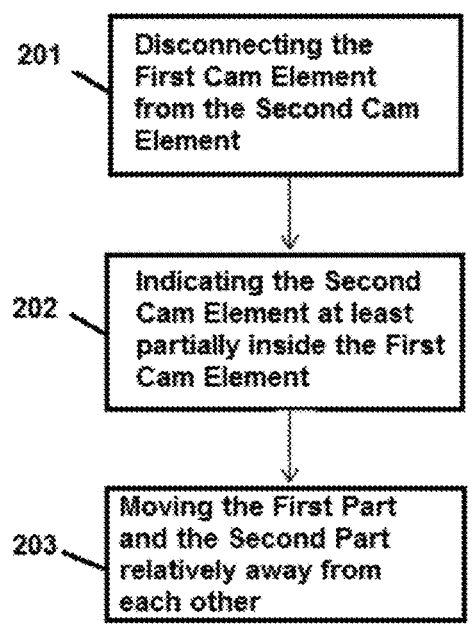
FIG. 6 is a diagrammatic illustration of a method for disconnecting such a connector according to an exemplary embodiment of the present disclosure.

According to one embodiment a method for disconnecting a connector according to any one of the preceding embodiments of the connector, using a remotely operated vehicle, ROV, is disclosed. Preferably this is done under water. The method comprises the following steps in order:

Firstly, step 201 in FIG. 6, disconnecting the first cam element (12) from the second cam element (22) by rotating the first cam element (12) relative to the second cam element (22).

Secondly, step 202 in FIG. 6, when the second cam element (29) is at least partly inside the first cam element (10), and the cam (14) and the protrusion (24) are physically separateable, then the indicator (40) indicates. This is when the protrusion (24) is not caught in the cam (14) and the first part (10) and the second part (20) can be separated.

Thirdly, step 203 in FIG. 6, upon indication of the indicator (40), moving the first part (10) and the second part (20) relatively away from each. When the indicator indicates, then the operator knows that it is safe and time to remove the first part (10) from the second part (20).

According to one embodiment, the methods described above may include that the indicator is one or more of the following: light, flashing light, light in different colours, sound, and a light combination of blue, green, and yellow light. The different colours may be, for example, blue, red, green, orange, pink, and yellow. The light combination has the technical effect of being easily detectable by the operator because this light combination is well visible in most waters regardless of the different colours of the water.

Figure 7:
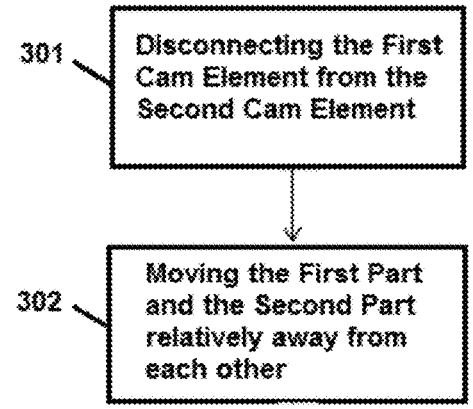

According to one embodiment a method for disconnecting a connector according to the connector embodiment with the wire (50) in an emergency situation, using a remotely operated vehicle, ROV, is disclosed. An emergency situation would be, for example, when the connector can not be disconnected according to the method for disconnecting the connector described above. The method comprising the following steps in order:

Firstly, step 301 in FIG. 7, disconnecting the first cam element (12) from the second cam element (22) by pulling the wire (50) by retracting the ROV, or only the wire (50), to rotate the first cam element (12) relative to the second cam element (22). Pulling the wire (50) causes the first cam element (12) to rotate relative to the second cam element (22) and thereby disconnecting the first part (10) from the second part (20).

Secondly, step 302 in FIG. 7, moving the first part (10) and the second part (20) relatively away from each other. This is may be done by simply retracting the ROV still holding on to the connectors handle (90).

According to one embodiment, as illustrated in FIG. 8, a lead screw (92) and a thread (94) for the lead screw (92) may be used for the connector instead of the cam mechanism. The use of a lead screw (92) would allow the first part (10) and the second part (20) to be pulled together with a large force. The connection and disconnection with couplings, such as quick fit couplings, having a high pressure, for example over 200 bar, about 20 MPa, can be made by using the lead screw. FIG. 8 is a schematic illustration of the first part (10) and the second part (20). The first part (10) comprising the lead screw (92). The second part (20) comprises a thread (94) for the lead screw (92). The thread (94) may be threaded directly in the second part (20). The thread (94) may be threaded in a nut (96) that in turn may be attached to the second part (20). The thread (94) may be threaded directly in the second part (20) and in the nut (96) that in turn may be attached to the second part (20).

According to one embodiment, the second part (20) may comprise at least one guide pin (18) and the first part (10) may comprise at least one opening (28) corresponding to, and for taking up, the at least one guide pin (18) of the second part (20). The at least one guide pin (18) may comprise one or more magnets (42) arranged axially along the guide pin (18). Preferably 1, 2, 3, 4, 5, 6, 7, 8, 9, or 10 magnets are used. When the guide pin (18) with one or more magnets (42) is inserted into the opening (28), then the indicator (40) arranged on the first part (10) is activated by the magnets. As long as the magnets (42) activates the indicator (40), the indicator indicates, for example blinks, and the operator making the connection knows that the guide pin (18) has been inserted into the opening (28) and the lead screw (92) should be operated to connect, or disconnect, the connector. When the magnet, or magnets, has passed and does not cause the indicator to indicate any more, then the operator knows that the guide pin (18) has been fully inserted into the opening (28) and that the connector is fully, and correctly, connected or disconnected.

According to one embodiment, the first part (10) may comprise a lock (93) to lock the rotation of the lead screw (92) relatively to the first part (10). The lock (93) may be unlocked by a guide pin (18) from the second part (20) entering an opening (28) on the first part (10). The lock (93) may be locked by a guide pin (18) from the second part (20) being removed from an opening (28) on the first part (10). Such a locking of the lead screw (92) relative to the first part (10) allows the operator to more easily align the first part (10) with the second part (20).

The embodiments described herein and in the claims relating to the connector using the cam mechanism apply mutatis mutandis to the connector using the lead screw instead of the cam mechanism. The embodiments described herein and in the claims relating to the methods of connecting and disconnecting the connector using the cam mechanism apply mutatis mutandis to the connector using the lead screw instead of the cam mechanism.

As previously mentioned, the disclosure is not limited in its application with respect to a certain type of hydraulic tube or hose, but can be applied to many other areas such as gas tubes, compressed air tubes, breathing air tubes, oil tubes, and tubes for acid. At least one embodiment may provide a connector and a method for using the connector that allows safe and spill free connection of fluids, especially subsea. The emergency function is especially useful to comply with national regulations concerning safety and no oil spill. It will be apparent to those skilled in the art that various modifications and variations can be made to the disclosed apparatus and method. Other embodiments will be apparent to those skilled in the art from consideration of the specification and practice of the disclosed apparatus and method. It is intended that the specification and examples be considered as exemplary only, with a true scope being indicated by the following claims and their equivalents.

The invention claimed is:

1. A connector for fluid, connectable by a remotely operated vehicle, ROV, the connector comprising:
    a first part comprising a first element for engagement with a second element, the first element being rotably arranged relative to the first part;
    a second part comprises the second element;
    a clutch between the first element and a handle to be held by the ROV, wherein the clutch is a torque limiting clutch preventing rotation of the first element when the handle is rotated over a pre-set torque;
    an indicator on the first part to indicate correct position for connecting, and disconnecting, the first part with, or from, the second part with the first element and the second element; and
    an emergency release mechanism to disconnect the first part from the second part.

2. The connector according to claim 1, wherein the emergency release mechanism is a wire connected to the first element, the wire going through a wire opening, the wire opening being arranged radially from the first element on the first part to allow the wire to release the first element from the second element when the wire is pulled.

3. The connector according to claim 2, wherein the length of the wire is shorter than the length of a shortest tube, for the fluid, arranged on the first part.

4. A method for disconnecting a connector according to claim 2 in an emergency situation using a remotely operated vehicle, ROV, the method comprising the following steps in order:
    disconnecting the first element from the second element by pulling the wire by retracting the ROV, or only the wire, to move the first element relative to the second element; and
    moving the first part and the second part relatively away from each other.

5. The connector according to claim 1, wherein the second element comprises a thread and the thread is threaded according to one, or both, of the following two options: directly in the second part, or in a nut comprised by the second part.

6. The connector according to claim 1, wherein the second part comprises at least one guide pin;
    wherein the first part comprises at least one openings corresponding to the at least one guide pin; and
    wherein a plurality of magnets are arranged axially along on one of the at least one guide pin, and wherein the magnets activate the indicator when the one of the least one guide pin is, at least partly, inside the corresponding at least one opening of the first part.

7. The connector according to claim 1, further comprising a first aiming element arranged on the first part; and
    a second aiming element arranged on the second part.

8. The connector according to claim 7, wherein the first aiming element is arranged, measured from a centre axis of the first element, at the same radial distance as the second aiming element is arranged, measured from a centre axis of the second element.

9. The connector according to claim 1, further comprising a mechanical visible element for indicating connected or disconnected status of the connector, the mechanical visible element being connected to the first element, the rotation of the first element positioning the mechanical visible element in a first position indicating a disconnected status of the connector and in a second position indicating a connected status of the connector.

10. The connector according to claim 1, further comprising a lock for locking rotation of the first element relative to the first part, the lock allowing the rotation when a guide pin is inside an opening and the lock locking the rotation when the guide pin is outside the opening.

11. The connector according to claim 1, wherein the first part comprises at least two guide pins, one of the guide pins being longer than the other guide pins; and
    wherein the second part comprises at least two openings corresponding to the at least one guide pins.

12. The connector according to claim 1, wherein one of, or both, the first part and the second part comprises at least one non-spill quick fit couplings for fluid.

13. A method for connecting a connector according to claim 1 using a remotely operated vehicle, ROV, the method comprising the following steps in order:
    moving the first part and the second part relatively toward each other;
    the indicator indicating when, the first element is in contact with the second element; and
    upon indication of the indicator, rotating the first element relative to the second element until the first part and the second part are fully connected.

14. The method for connecting a connector according to claim 13, further comprising:
    a mechanical visible element for indicating connected or disconnected status of the connector, the mechanical visible element being connected to the first element, the rotation of the first element positioning the mechanical visible element in a first position indicating a disconnected status of the connector and in a second position indicating a connected status of the connector; and
    the mechanical visible element indicating the connected status within the view of the aim.

15. The method for connecting according to claim 13, wherein the indicator is at least one of the following: light, flashing light, light in different colours, sound, and a light combination of blue, green, and yellow light.

16. The method for disconnecting a connector according to claim 13, wherein the first element is a lead screw and the second element is a thread.

17. A method for disconnecting a connector according to claim 1 using a remotely operated vehicle, ROV, the method comprising the following steps in order:
    disconnecting the first element from the second element, and when the first element physically separateable from the second element then the indicator indicates; and upon indication of the indicator, moving the first part and the second part relatively away from each.

18. The connector according to claim 1, wherein the first element is a lead screw and the second element is a thread.

19. A connector for fluid, connectable by a remotely operated vehicle, ROV, the connector comprising:
- a first part comprising a first cam element comprising an opening and a cam for engagement of a protrusion, the first cam element and the cam being rotably arranged relative to the first part;
- a second part comprises a second cam element for insertion into the opening, the second cam element comprising the protrusion for the cam;
- a clutch between the first cam element and a handle to be held by the ROV, wherein the clutch is a torque limiting clutch preventing rotation of the first element when the handle is rotated over a pre-set torque;
- an indicator on the first part to indicate correct position for connecting, and disconnecting, the first part with, or from, the second part with the first and second cam elements; and
- an emergency release mechanism to disconnect the first part from the second part.

20. The connector according to claim 19, wherein a magnet is arranged on the second cam element, and wherein the magnet activates the indicator when the second cam element is, at least partly, inside the opening of the first cam element.

* * * * *

UNITED STATES PATENT AND TRADEMARK OFFICE
CERTIFICATE OF CORRECTION

| | | |
|---|---|---|
| PATENT NO. | : 10,473,251 B2 | Page 1 of 1 |
| APPLICATION NO. | : 15/408969 | |
| DATED | : November 12, 2019 | |
| INVENTOR(S) | : Leif Nyfelt | |

It is certified that error appears in the above-identified patent and that said Letters Patent is hereby corrected as shown below:

On the Title Page

Item (30)    Replace "January 19, 2016 (GB) 600952.4" with
--January 19, 2016 (GB) 1600952.4--

Signed and Sealed this
Twenty-fifth Day of February, 2020

Andrei Iancu
*Director of the United States Patent and Trademark Office*